US009715704B2

(12) United States Patent
Itwaru

(10) Patent No.: US 9,715,704 B2
(45) Date of Patent: Jul. 25, 2017

(54) MERCHANT ORDERING SYSTEM USING OPTICAL MACHINE READABLE IMAGE REPRESENTATION OF INVOICE INFORMATION

(75) Inventor: Mark Itwaru, Toronto (CA)

(73) Assignee: Riavera Corp, Toronto (CA)

( * ) Notice: Subject to any disclaimer, the term of this patent is extended or adjusted under 35 U.S.C. 154(b) by 0 days.

(21) Appl. No.: 13/397,297

(22) Filed: Feb. 15, 2012

(65) Prior Publication Data

US 2012/0290418 A1 Nov. 15, 2012

Related U.S. Application Data

(63) Continuation-in-part of application No. 13/105,803, filed on May 11, 2011.

(Continued)

(51) Int. Cl.
*G06Q 20/20* (2012.01)
*G06Q 30/06* (2012.01)

(Continued)

(52) U.S. Cl.
CPC .................................... *G06Q 30/04* (2013.01)

(58) Field of Classification Search
USPC ..... 235/462.45, 494; 705/23, 64, 40, 17, 16, 705/18, 35, 44
See application file for complete search history.

(56) References Cited

U.S. PATENT DOCUMENTS 5,729,594 A 3/1998 Klingman
5,778,173 A 7/1998 Apte (Continued)

FOREIGN PATENT DOCUMENTS

CA 2769235 A1 2/2011
DE 102007059816 A1 6/2009

(Continued)

OTHER PUBLICATIONS

International Search Report and Written Opinion dated Aug. 27, 2012 issued from the Canadian Intellectual Property Office relating to PCT International Patent Application No. PCT/CA2012/000453.

(Continued)

*Primary Examiner* — Scott Zare
*Assistant Examiner* — Reva R Danzig
(74) *Attorney, Agent, or Firm* — Grant Tisdall; Gowling WLG (Canada) LLP

(57) ABSTRACT

A system and method for assisting ordering and payment processing of an order invoice associated with a product selected by a customer. The system comprises collecting product data about the product and generates the order invoice information for use by at least an accounting system of the merchant. The system receives symbology information in an aggregated barcode associated with the order invoice, the symbology information including at least a portion of the order invoice information encoded using a coding scheme of a barcode. The system provides an image of the aggregated barcode to the customer for use in generating a transaction request for settlement of the order invoice, and receives a transaction response indicating transaction approval or transaction denial of the order invoice.

16 Claims, 7 Drawing Sheets

Related U.S. Application Data

(60) Provisional application No. 61/485,075, filed on May 11, 2011.

(51) Int. Cl.

| | |
|---|---|
| ***G07G 1/12*** | (2006.01) |
| ***G06Q 30/04*** | (2012.01) |
| *G06Q 40/00* | (2012.01) |
| *G06Q 40/06* | (2012.01) |
| *G06Q 40/04* | (2012.01) |
| *G06Q 20/40* | (2012.01) |
| *G06Q 20/10* | (2012.01) |
| *G06K 7/14* | (2006.01) |

(56) References Cited

U.S. PATENT DOCUMENTS

| | | | | |
|---|---|---|---|---|
| 5,799,285 | A | 8/1998 | Klingman | |
| 5,903,721 | A | 5/1999 | Sixtus | |
| 5,923,735 | A | 7/1999 | Swartz et al. | |
| 5,963,915 | A | 10/1999 | Kirsch | |
| 5,970,475 | A | 10/1999 | Barnes et al. | |
| 5,992,752 | A | 11/1999 | Wilz, Sr. et al. | |
| 6,012,144 | A | 1/2000 | Pickett | |
| 6,038,589 | A | 3/2000 | Holdsworth | |
| 6,058,250 | A | 5/2000 | Harwood et al. | |
| 6,078,902 | A | 6/2000 | Schenkler | |
| 6,086,618 | A | 7/2000 | Al-Hilali et al. | |
| 6,088,683 | A | 7/2000 | Jalili | |
| 6,138,146 | A | 10/2000 | Moon et al. | |
| 6,233,565 | B1 | 5/2001 | Lewis et al. | |
| 6,332,134 | B1 | 12/2001 | Foster | |
| 6,675,008 | B1 | 1/2004 | Paik et al. | |
| 6,704,873 | B1 | 3/2004 | Underwood | |
| 7,379,921 | B1 | 5/2008 | Kiliccote | |
| 7,387,250 | B2 | 6/2008 | Muni | |
| 7,581,257 | B1 | 8/2009 | O'Hara | |
| 8,016,187 | B2 | 9/2011 | Frantz et al. | |
| 8,275,699 | B2 | 9/2012 | Shader et al. | |
| 2002/0062281 | A1 | 5/2002 | Singhal | |
| 2002/0066039 | A1 | 5/2002 | Dent | |
| 2002/0066042 | A1 | 5/2002 | Matsumoto et al. | |
| 2002/0069165 | A1 | 6/2002 | O'Neil | |
| 2002/0077976 | A1* | 6/2002 | Meyer | G06Q 20/04 705/40 |
| 2002/0107745 | A1 | 8/2002 | Loeser | |
| 2003/0195843 | A1 | 10/2003 | Matsuda et al. | |
| 2005/0029358 | A1 | 2/2005 | Mankins | |
| 2005/0125301 | A1* | 6/2005 | Muni | G06Q 30/06 705/23 |
| 2005/0197968 | A1* | 9/2005 | Das | G06Q 20/382 705/64 |
| 2007/0119917 | A1 | 5/2007 | Tomikawa et al. | |
| 2007/0194123 | A1* | 8/2007 | Frantz | G06K 17/0022 235/462.45 |
| 2007/0244811 | A1 | 10/2007 | Tumminaro | |
| 2007/0255620 | A1 | 11/2007 | Tumminaro et al. | |
| 2008/0172314 | A1 | 7/2008 | Hahn-Carlson | |
| 2008/0222048 | A1 | 9/2008 | Higgins et al. | |
| 2008/0285755 | A1 | 11/2008 | Camus et al. | |
| 2008/0313081 | A1 | 12/2008 | Wee | |
| 2009/0090783 | A1 | 4/2009 | Killian et al. | |
| 2009/0108080 | A1* | 4/2009 | Meyer | G06Q 20/102 235/494 |
| 2009/0222353 | A1* | 9/2009 | Guest | G06Q 20/204 705/17 |
| 2009/0240626 | A1 | 9/2009 | Hasson et al. | |
| 2009/0254479 | A1 | 10/2009 | Pharris | |
| 2009/0254485 | A1 | 10/2009 | Baentsch et al. | |
| 2009/0266893 | A1 | 10/2009 | Chen | |
| 2010/0138344 | A1* | 6/2010 | Wong | G06Q 20/10 705/44 |
| 2010/0169223 | A1 | 7/2010 | Yuan | |
| 2010/0211506 | A1 | 8/2010 | Chang et al. | |
| 2011/0145093 | A1 | 6/2011 | Paradise et al. | |
| 2011/0212707 | A1 | 9/2011 | Mahalal | |
| 2011/0244920 | A1 | 10/2011 | Coppinger | |
| 2011/0251892 | A1 | 10/2011 | Laracey | |
| 2012/0030121 | A1 | 2/2012 | Grellier | |
| 2012/0066081 | A1* | 3/2012 | Shader | G06Q 20/14 705/18 |
| 2012/0078751 | A1 | 3/2012 | Macphail et al. | |
| 2012/0130889 | A1 | 5/2012 | Lyons et al. | |
| 2012/0136797 | A1 | 5/2012 | Coppinger | |
| 2012/0203673 | A1* | 8/2012 | Morgan | G06Q 20/3276 705/27.1 |
| 2012/0290418 | A1 | 11/2012 | Itwaru | |

FOREIGN PATENT DOCUMENTS

| | | | |
|---|---|---|---|
| EP | 0765068 | A2 | 3/1997 |
| EP | 0813325 | A2 | 12/1997 |
| EP | 0926611 | A2 | 6/1999 |
| EP | 1921578 | A1 | 5/2008 |
| EP | 2073160 | A1 | 6/2009 |
| EP | 2088549 | A1 | 8/2009 |
| WO | 9637848 | A1 | 11/1996 |
| WO | 0195591 | A1 | 12/2001 |
| WO | 02102133 | A2 | 12/2002 |
| WO | 2011112752 | A1 | 9/2011 |
| WO | 2011127354 | A2 | 10/2011 |
| WO | 2011130422 | A2 | 10/2011 |
| WO | 2012111019 | A1 | 8/2012 |
| WO | 2012151660 | A1 | 11/2012 |
| WO | 2012158506 | A1 | 11/2012 |

OTHER PUBLICATIONS

Gao, et al., "A 2D Barcode-Based Mobile Payment System", 2009 Third International Conference on Multimedia and Ubiquitous Engineering, pp. 320-329, Jun. 4-6, 2009.

International Search Report and Written Opinion dated May 24, 2012 issued from the Canadian Intellectual Property Office relating to PCT International Patent Application No. PCT/CA2012/000223.

International Search Report and Written Opinion dated Jul. 30, 2012 issued from the Canadian Intellectual Property Office relating to PCT International Patent Application No. PCT/CA2012/000452.

Ion, et al., "Don't trust POS terminals! Verify in-shop payments with your phone", presented at Pervasive 2008 Sixth International Conference on Persuasive Computing, Sydney Australia, http://www.persuasive2008.org/.

International Search Report and Written Opinion dated Apr. 15, 2013 issued from the Canadian Intellectual Property Office relating to PCT International Patent Application No. PCT/CA2013/000135.

International Search Report and Written Opinion dated Apr. 29, 2013 issued from the Canadian Intellectual Property Office relating to PCT International Patent Application No. PCT/CA2013/000136.

* cited by examiner

MERCHANT ORDERING SYSTEM USING OPTICAL MACHINE READABLE IMAGE REPRESENTATION OF INVOICE INFORMATION

CROSS-REFERENCE TO RELATED APPLICATIONS

This application claims priority to U.S. Provisional Patent Application Ser. No. 61/485,075 filed May 11, 2011 and is a Continuation-In-Part to U.S. patent application Ser. No. 13/105,803, filed May 11, 2011, all of which are hereby incorporated by reference in their entirety.

FIELD

The present invention is related to merchant product ordering systems using optical machine readable images such as barcodes to expedite invoicing.

BACKGROUND

Barcodes and other optical machine readable images are used extensively to represent information about an object. Decoding or reading a barcode is accomplished by translating the patterns of the barcode, such as bars and spaces in linear barcodes or blocks or other features in a 2D barcode, into the corresponding numbers or characters. Barcodes are widely used for encoding information and tracking purposes in retail, shipping and industrial settings. Barcodes and their uses are becoming more mainstream, however their uses remain mostly in providing static information about a particular product or service, or in recent years providing a static link to a website in relation to the product or service associated with the barcode.

For years, the merchant ordering and payment systems, and banking and payment processing in general, have been trying to engineer a transaction processing technology that is secure, efficient and easy to use, thereby facilitating the customers shopping and payment experience, both at point of sale (POS) terminals and for online shopping. In particular, providing the customer with some control in how their personal financial information is provided to the merchant has so far been elusive. This inability to involve more customer control of the transaction while at the same time streamlining the amount of time and information a customer must spend and provide during the product ordering and purchasing process has effectively relegated customer experience in product purchasing to that of yesterday rather than the future. In particular, the leveraging of current and future mobile technology capabilities to the product transaction market to predominantly the purchase of downloadable items such as ringtones and music. Barcodes have been used in an effort to speed up the customer experience by providing merchant terminals information about the product when scanned through a checkout scanner, i.e. the price and brief description of the product that the barcode is attached/applied to. However, any use of the barcode during the customer shopping experience, other than as a look up service for a price of a product on a product by product basis, is simply not available.

At the same time, developments in the field of mobile commerce are being facilitated by improved functionality and features available on mobile devices, and by such functionality and features becoming more commonplace on current mobile devices. For example, cell phones, smart phones and tablet computers nowadays are commonly integrated, multi-functional devices. In addition to their core, basic functionality, they will often have, or can be configured to have, web-enabled functionality, various other communication capabilities (e.g., e-mail, text, wi-fi, etc.), camera functions, scanning and graphical image handling functionalities and other capabilities. Graphical interfaces of desktop computers have also become more advanced in their functionality and provided features. However, to date the customer shopping experience during checkout (either in person or online) has not benefited from these advanced functionality and provided features of desktop GUIs and mobile devices.

SUMMARY

Presently there is a need to provide a system and method to integrate the use of optical machine readable images in bettering the customer ordering and purchasing experience that addresses at least one of the identified problems in the current state of the art.

Currently, providing the customer with some control in how their personal financial information is provided to the merchant has so far been elusive. This inability to involve more customer control of the transaction while at the same time streamlining the amount of time and information a customer must spend and provide during the product ordering and purchasing process has effectively relegated customer experience in product purchasing to that of yesterday rather than the future. Contrary to current systems there is provided a system and method for assisting ordering and payment processing of an order invoice associated with a product selected by a customer. The system comprises collecting product data about the product including a product price, merchant data including merchant identification for use in identifying merchant financial account information by the transaction processing system. The system generates the order invoice information including the product data, the merchant data, a total invoice amount for payment by the customer and an invoice identification for use by at least an accounting system of the merchant. The system receives symbology information in an aggregated barcode associated with the order invoice, the symbology information including at least a portion of the order invoice information encoded using a coding scheme of a barcode. The system provides an image of the aggregated barcode to the customer for use in generating a transaction request for settlement of the order invoice, and receives a transaction response, the transaction response including processing details of the transaction request by the processing system, the transaction response indicating transaction approval or transaction denial of the order invoice.

A first aspect provided is a system including an order interface for assisting ordering and payment processing of an order invoice associated with a product selected by a customer, the order interface coupled to a transaction processing system over a communications network, the system comprising: a computer processor coupled to a memory, wherein the computer processor is programmed to assemble order invoice information pertaining to the product and provide the order invoice information including product data, merchant data and invoice data to the customer by: collecting the product data about the product including a product price; collecting the merchant data including merchant identification for use in identifying merchant financial account information by the transaction processing system; generating the order invoice information including the product data, the merchant data, a total invoice amount for payment by the customer and an invoice identification for use by at least an accounting system of the merchant; receiving symbology information in an aggregated barcode associated with the order invoice, the symbology information including at least a portion of the order invoice information encoded using a coding scheme of a barcode; providing an image of the aggregated barcode to the customer for use in generating a transaction request for settlement of the order invoice; and receiving a transaction response, the transaction response including processing details of the transaction request by the processing system, the transaction response indicating transaction approval or transaction denial of the order invoice.

A second aspect provided is a system including an order interface hosted on computer device for assisting ordering and payment processing of an order invoice associated with a product selected by a customer, the computer device coupled to a transaction payment processing system over a communications network, the system comprising: a computer processor coupled to a memory, wherein the computer processor is programmed to assemble order invoice information pertaining to the product and provide the order invoice information including product data, merchant data and invoice data to the customer by: collecting the order invoice information to include the product data about the product including a product price, the merchant data including merchant identification for use in identifying merchant financial account information by the transaction payment processing system, and invoice data including a total invoice amount for payment by the customer and an invoice identification for use by at least an accounting system of the merchant; selecting unencoded data from the order invoice information and encoding the unencoded data into symbology information using a coding scheme of a barcode; producing an aggregated barcode including the symbology information, the aggregated barcode representing the order invoice; and sending the aggregated barcode for subsequent presentment as an image to the customer for use by the customer in generating a transaction request for settlement of the order invoice.

A third aspect provided is a method for processing an order invoice associated with a product selected by a customer, the method comprising: collecting product data about the product including a product price; collecting merchant data including merchant identification for use in identifying merchant financial account information by the transaction processing system; generating, using a computer processor, the order invoice information including the product data, the merchant data, a total invoice amount for payment by the customer and an invoice identification for use by at least an accounting system of the merchant; receiving, using the computer processor, symbology information in an aggregated barcode associated with the order invoice, the symbology information including at least a portion of the order invoice information encoded using a coding scheme of a barcode; providing, using the computer processor, an image of the aggregated barcode to the customer for use in generating a transaction request for settlement of the order invoice; and receiving a transaction response, the transaction response including processing details of the transaction request by the processing system, the transaction response indicating transaction approval or transaction denial of the order invoice.

A fourth aspect provided is a method for processing of an order invoice associated with a product selected by a customer, the method comprising: collecting the order invoice information to include product data about the product including a product price, merchant data including merchant identification for use in identifying merchant financial account information, and invoice data including a total invoice amount for payment by the customer and an invoice identification for use by at least an accounting system of the merchant; selecting, using the computer processor, unencoded data from the order invoice information and encoding the unencoded data into symbology information using a coding scheme of a barcode; producing, using the computer processor, an aggregated barcode including the symbology information, the aggregated barcode representing the order invoice; and sending the aggregated barcode for subsequent presentment as an image to the customer for use by the customer in generating a transaction request for settlement of the order invoice.

BRIEF DESCRIPTION OF THE DRAWINGS

Exemplary embodiments of the invention will now be described in conjunction with the following drawings, by way of example only, in which.

DESCRIPTION OF VARIOUS EMBODIMENTS

It will be appreciated that for simplicity and clarity of illustration, where considered appropriate, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementations of various embodiments described herein.

The embodiments of the systems, devices and methods described herein may be implemented in hardware or software, or a combination of both. Some of the embodiments described herein may be implemented in computer programs executing on programmable computers, each computer comprising at least one processor, a computer memory (including volatile and non-volatile memory), at least one input device, and at least one output device. For example, and without limitation, the programmable computer can be a mobile computing device having a processor for processing optical machine readable images (e.g. barcode images) and program code, a server computer having a processor for generating barcodes based on invoice information and processing program code, an image sensor for capturing images, and at least one network interface for communicating payment transaction information and/or generated optical machine readable images. Program code may be executed by the processor to operate on input data, such as the captured image, to perform the functions described herein and generate output data representative of transaction data. Further, program code may be executed by the processor to operate on input data, such as the invoice data provided by merchant product order systems for a plurality of products, to perform the functions described herein and generate output data as an optical machine readable image representing encoded invoice data.

Product Ordering System 10

Figure 1:
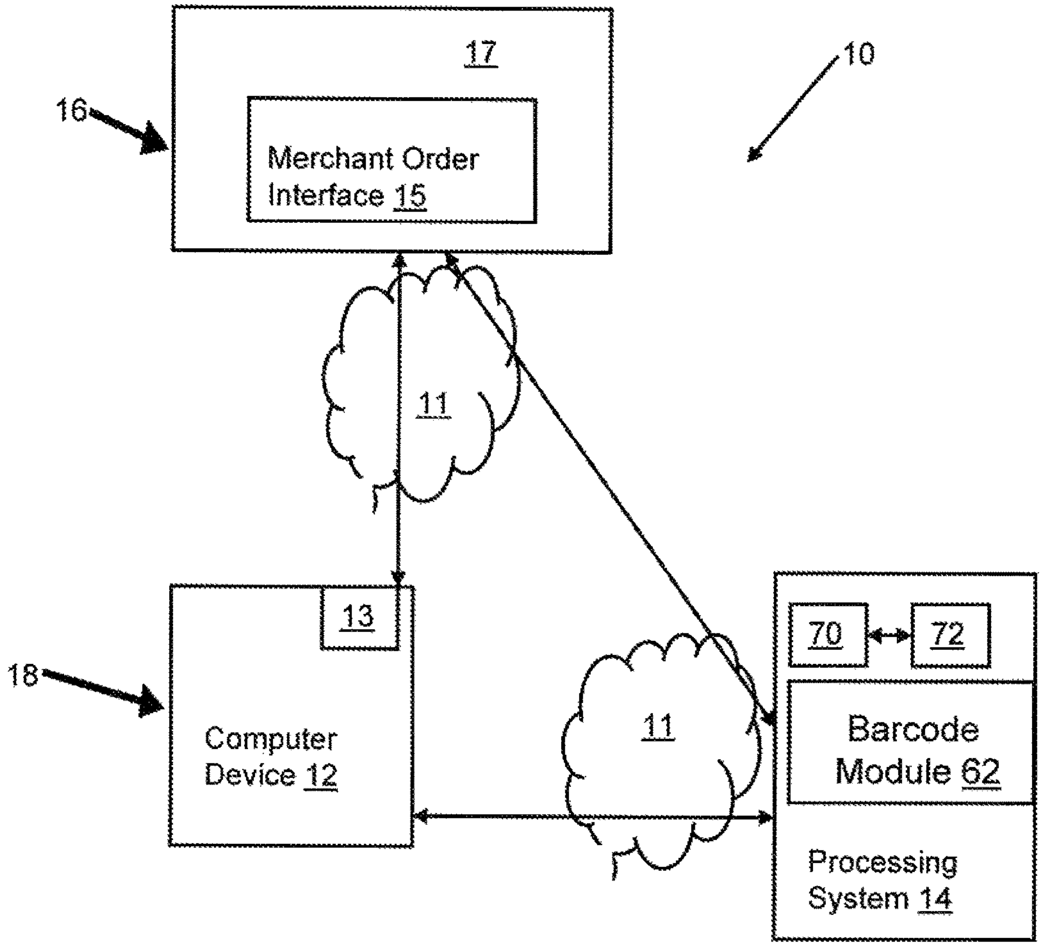
FIG. 1 is a block diagram of components of a product ordering system.

Referring to FIG. 1, shown is a product ordering system 10 having a merchant order interface 15 hosted on a merchant computer device 17 (e.g. a server) remotely coupled over a communications network 11 to a computer device 12 of a customer 18. The order interface 15 of the merchant 16 can be a web site (hosted on the merchant computer device 17) accessible over the communications network 11 by the customer 18 using a browser operating on the computer device 12. Further, a payment and transaction processing system 14 is connected via the communications network 11 to the computer device 12 and the merchant order interface 15. Accordingly, the order interface 15, computer device 12 and processing system 14 can interact (via network messages) together to initiate and complete order and payment of products offered by the merchant 16 to the customer 18, such that an optical machine readable image (OMRI) 200 (e.g. aggregated barcode) (see FIG. 3) is generated during the order process by the order interface 15. The OMRI 200 is used by the product ordering system 10 to represent and facilitate processing of an order invoice 202 containing textual (e.g. unencoded) aggregated information 201 (e.g. product pricing numbers, total invoice numbers, merchant 18 and/or customer 16 identification/account numbers, invoice numbers, product descriptions and/or payment terms, etc.) that is encoded as symbology information 204 for a plurality of products, ordered by the customer 18 from the merchant 16 via the order interface 15, as further described below. It is also recognized that the aggregated OMRI 200 can be used by the product ordering system 10 to represent and facilitate processing of an order invoice 202 containing the unencoded aggregated information 201 encoded as symbology information 204 for at least one product ordered by the customer 18 from the merchant 16. Accordingly, processing of the order invoice 202 involves the use of the optical machine readable image (OMRI) 200 that contains encoded invoice data, as further described below.

In a further embodiment (see FIG. 4), discussed below, the computer device 12 device does not necessarily have to communicate with the order interface 15 over the communications network 11, in order to receive the aggregated OMRI 200, however does interact with the order interface 15 presented to the customer 18 on a merchant display screen and/or on printed label at a merchant physical retail location. In this manner, the customer 18 can record an image of the aggregated OMRI 200 by using an imager of the computer device 12 (e.g. a camera enabled mobile device), for subsequent processing by the computer device 12 and the transaction processing system 14.

Definition of Products

In economics, economic output is divided into goods and services. When an economic activity yields a valuable or useful thing, it can be known as production output of the totality of products (e.g. goods or services) in an economy that the merchant 16 makes available for use by the customers 18. Products as goods can range from a simple safety pin, food, clothing, computer components to complex machinery and electronic or physical media (physical or electronic versions of music, print media, etc.). Products as services are the performance of any duties or work for another (e.g. helpful or professional activity) and can be used to define intangible specialized economic activities such as but not limited to: providing access to specific information; web services; transport; banking; legal advice; accounting advice; management consultant advice; and medical services. The merchant 16 providing the products can be a businessperson or individual engaged in wholesale/retail trade, an organization, an administration, and/or a business that sells, administers, maintains, charges for or otherwise makes available product(s) that are desirable by the customers 18. Accordingly, the merchant 16 can be one person, or an association of persons, for the purpose of carrying on some enterprise or business; a corporation; a firm; etc. Further, it is recognised that the products can be related to company activities not related to specific product (s), for example customer service, community activities, donations, and/or sponsorships. These general activities of the merchant 16 are also considered as part of the definition of merchant 16 products.

It is recognized that the merchant 16 products can include restaurant meals (and/or service), such that the order invoice 202 represents a meal bill and the products are individual food and/or beverage items. It is also recognized that the merchant 16 products can be groceries or other retail items being paid for in person by the customer 18 at the merchant retail establishment, for example.

Example Configuration of the Computer Devices 12,17

As further discussed, the merchant products are offered for sale via the order interface 15 (i.e. online interface) that is accessible over the communications network 11. The order interface 15 provides the customer 18 with the ability to select and/or specify a plurality of desired products for purchase and also generates an aggregated OMRI 200 (see FIG. 3) that contains encoded invoice information (the symbology information 204) representing summary information (e.g. product listing, total purchase price, etc.) of the plurality of products, e.g. one barcode representing invoice data for two or more products. In any event, it is recognized that the aggregated OMRI 200 is generated by the order interface 15 to contain data (e.g. product data 206, merchant data 208, customer data 211 and/or invoice data 210) of the order invoice 202 pertaining to the plurality of products, including payment transaction data needed by the processing system 14 to settle the financial transaction (associated with the invoice data) by transferring funds from a specified customer account to a specified merchant account. It is also recognized that the order invoice 202 could contain order invoice 202 data pertaining to only one product, as desired.

It is recognized that network 11 communication messages facilitating the certain aspects of payment processing of the order invoice 202 are preferably between a payment application 13 running on the computer device 12 and the processing system 14 (or the transaction interface 15 and the payment processing system 14), rather than directly between the payment application 13 and the transaction interface 15. The payment application 13 can operate as a client of the processing system 14, such that the payment application 13 of the computer device 12 is registered with the processing system 14. It is also recognized that the merchant order interface 15 can also operate as a client of the processing system 14, such that the merchant order interface 15 of the computer device 12 is registered with the processing system 14. Registration details (of the merchant 16 and/or the customer 18) can include financial account information stored by the processing system 14.

Therefore, in one embodiment, in the event that the payment application 13 needs (e.g. request) information from transaction interface 15 relating to payment processing of the order invoice 202, these request (and response) network 11 messages would go through the payment processing system 14 acting as an intermediary network interface between the payment application 13 and the transaction interface 15. Therefore, in another embodiment, in the event that the transaction interface 15 needs (e.g. request) information from the payment application 13 relating to payment processing of the order invoice 202, these request (and response) network 11 messages would go through the processing system 14 acting as an intermediary network interface between the payment application 13 and the transaction interface 15. However, it is recognized that network 11 messaging pertaining to payment processing directly between the payment application 13 and the transaction interface 15 can also be configured, for example for the purpose of gathering information relevant to confirming the status of the payment processing of the invoice order 202 (as implemented by the processing system 14), i.e. that that the customer 18 has indeed deposited funds from an account 70 of the customer 18 into an account 72 of the merchant 16 (as settled by the processing system 14).

Settlement pertaining to the order invoice 202 can be defined as where a payment amount is transferred from the account 70 of the customer 18 to the account 72 of the merchant 16, i.e. the credit and debit transactions of the payment amount against the respective accounts 70,72 are either performed (e.g. in real time) or promised to be performed (e.g. included in a batch transaction to be performed later in the day or following business day).

Barcode 200

The OMRI 200 (i.e. an optical machine-readable representation of data) representing order invoice 202 content contains symbology information 204 in encoded form based on a coding scheme 209. One example of the OMRI 200 is a barcode, such that the coding scheme 209 is a barcode coding scheme for use in encoding and decoding of the symbology information 204 of the barcode. Another example of the OMRI 200 is a dataglyph, such that the coding scheme 209 is a dataglyph coding scheme for use in encoding and decoding of the symbology information 204 of the dataglyph.

Referring again to FIG. 3, as used herein, the OMRI 200 (e.g. barcode, dataglyph, etc.) refers to an optical machine-readable representation of encoded information or data, presented as an ordered pattern of symbols (i.e. symbology information 204). For example, barcodes can encode information in the widths and the spacing of parallel lines, and may be referred to as linear or 1D (1 dimensional) symbologies. Barcodes can also encode information in patterns of squares, dots, hexagons and other geometric shapes or symbols within images termed 2D (2 dimensional) matrix codes or symbologies. Typically, although 2D systems use symbols other than bars, they are generally referred to as barcodes as well. Accordingly, barcode images discussed herein for use with a barcode scanner or decoder can refer to either 1D or 2D barcodes. With conventional monochromatic barcodes, features are typically printed in black on a white background, thereby forming a pattern that is used to form the machine-readable representation of invoice information of the order invoice 202. With color barcodes, the pattern can include any number of colors (typically also including black and white) distinguishable from one another during the barcode decoding process.

The aggregated OMRI 200 is generated to include symbology information 204 representing order invoice 202 content used to define product and payment terms/details concerning the product(s) purchased by the customer 18 from the merchant 16 (see FIG. 1). As discussed further below, the aggregated OMRI 200 can be electronically displayed (e.g. on a computer display), can be provided as graphic content (e.g. an image file such as but not limited to a GIF or JPEG) in a network message) and/or can be provided in printed form (e.g. presented on a physical medium such as paper or plastic—for example associated with a picture in a magazine or present on a label). As discussed, interaction between the aggregated OMRI 200 and the customer 18 placing the order for the collection of products can include customer 18 actions such as but not limited to: selection (e.g. via mouse or other pointer) on a user interface 104 of the customer device 12 displaying the aggregated OMRI 200; receiving an image file containing the aggregated OMRI 200; and/or recording/capturing the image of the aggregated OMRI 200 using an imager 118 (e.g. camera) (see FIG. 6) of the computer device 12 (e.g. mobile device), such that the aggregated OMRI 200 is displayed on physical media and/or electronic media (i.e. an electronic display adjacent to the customer device 12 and in-range of the imager 118). Example environments of the described image capture process would be where the aggregated OMRI 200 is displayed on a desktop computer of the customer 18 or on a computer terminal (part of the order interface 15) of the merchant 16.

In terms of the symbology information 204 of the aggregated OMRI 200, the symbology information 204 includes a plurality of symbols (i.e. graphical elements) that, as a collection of symbols or patterns (e.g. an organized collection of symbols forms a legend, or key), represents encoded invoice information that is distinct from the actual unencoded invoice information 201 itself. For example, a graphical element (of the symbology 204) of a black line of a specific width represents a textual element (of the textual information 201) as the number six, while a different width represents a different textual element (of the textual information 201) such as the number two. It is recognized that graphical elements can be pictures (e.g. images) of text elements and/or of non-text elements. For example, the graphical element "6" (e.g. encoded or symbology information 204) in the coding scheme 209 could be mapped to a product code "1234" (e.g. unencoded information 201). In another example, the graphical element "(*)" (e.g. encoded or symbology information 204) in the coding scheme 209 could be mapped to a product code "1234" (e.g. unencoded information 201).

The purpose of the symbology information 204 is to communicate encoded invoice information (that defines a plurality of invoice parameters) as readable (e.g. decodable) by a decoder. The decoder could be present on the customer device 12 and/or on the transaction payment processing system 14, as further described below. It is recognized that mapping (i.e. processing performed by the decoder or encoder) between the symbology information 204 and the unencoded order invoice 202 data is what enables the aggregated OMRI 200 to be generated and interpreted. A specification of the symbology information 204 can include the encoding of the single digits/characters of the order invoice 202 textual data as well as the start and stop markers into individual symbols (e.g. bars) and space between the symbols of the symbol collection/pattern, the size of a quiet zone required to be before and after the aggregated OMRI 200, as well as a computation of a checksum incorporated into the aggregated OMRI 200 for error checking purposes as is known in the art.

It is recognized that the aggregated OMRI 200 do not contain descriptive data, rather the aggregated OMRI 200 can be used as reference codes (e.g. decoded barcode information) that a computer uses to look up an associated record that contains the descriptive unencoded order invoice data 201, as well as any other relevant information about the products or items associated with the order invoice 202 encoded in the aggregated OMRI 200. For example, the matching item record of the symbology information 204 can contain a description of the product, vendor name, product price, quantity-on-hand, etc., including any of the product data 206, merchant data 208, customer data 211 and/or invoice data 210 as further described below. However, some OMRI 200 can contain, besides reference ID, additional or supplemental information such as product name or manufacturer, for example, and some 2D OMRI 200 may contain even more information as they can be more informationally dense due the greater variation potential of the printed patterns over those of 1D OMRI 200.

In terms of different barcode type, linear symbologies (e.g. UPC barcodes as an example symbology format of the aggregated OMRI 200) can be classified mainly by two properties, continuous vs. discrete and two-width vs. many-width. In continuous vs. discrete, characters (i.e. representing the invoice data content) in continuous symbologies usually abut, with one character ending with a space and the next beginning with a bar (e.g. light-dark patterns), or vice versa. Characters (i.e. representing the invoice data content) in discrete symbologies begin and end with bars and any intercharacter space is ignored as long as it is not wide enough to look like the code ends. In two-width vs. many-width, bars and spaces in two-width symbologies are wide or narrow, and the exact width of a wide bar has no significance as long as the symbology requirements for wide bars are adhered to (usually two to three times wider than a narrow bar). Bars and spaces in many-width symbologies are all multiples of a basic width called the module, wherein most such codes use four widths of 1, 2, 3 and 4 modules. Some linear symbologies use interleaving, such that the first character (i.e. representing the invoice data content) is encoded using black bars of varying width. The second character (i.e. representing the invoice data content) is then encoded, by varying the width of the white spaces between these bars. Thus characters (i.e. representing the invoice data content) are encoded in pairs over the same section of the barcode. Stacked symbologies repeat a given linear symbology vertically.

In terms of multidimensional symbologies (e.g. 2D, 3D, etc.), the most common among the many 2D symbologies are matrix codes, which feature square or dot-shaped modules (i.e. representing the invoice data content) arranged on a grid pattern. 2-D symbologies also come in circular and other patterns and may employ steganography, thereby hiding modules within an image (for example, using DataGlyphs). Aztec Code is another type of 2D barcode.

Quick Response Codes (QRC) is another a type of matrix barcode (or two-dimensional code) providing faster readability and larger storage capacity compared to traditional UPC barcodes. The QR code (as an example symbology format of the aggregated OMRI 200) consists of black modules arranged in a square pattern on a white background. The information encoded can be made up of four standardized kinds ("modes") of encoded data (e.g. numeric, alphanumeric, byte/binary, and/or Kanji), or by supported extensions virtually any kind of data.

It is also recognized that the symbology information 204 of the OMRI 200 can include custom graphical elements (as codified in the coding scheme 209) involving combinations of one or more graphical elements used to represent a textual element, e.g. a corporate logo is used as a collection of graphical elements (e.g. circle, square, and company name) that is mapped (e.g. decoded) by the coding scheme 209 to represent a textual element (e.g. a URL to a webpage of the company website). Alternatively, the textual element can be mapped (e.g. encoded) by the coding scheme 209 to represent the collection of graphical elements. In this example, the graphical element of a company name (the symbology information 204) is decoded by the coding scheme 209 to represent the text of the URL (the unencoded information 201). One example of barcodes containing custom graphical elements is Microsoft™ Tag barcodes.

Microsoft™ Tags as an OMRI 200 are another type of barcode, e.g. 2D barcodes, which offer more flexibility than traditional barcode formats both in the barcode design and the content behind it. Because Microsoft Tag barcodes can be linked to data stored on a server, you can deliver a more robust online experience—including entire mobile sites—and update the content any time without having to change the Microsoft Tag. So, if you link a Microsoft Tag on your business card to your résumé, it will still be valid after you get that big promotion. Microsoft Tags can be black-and-white or full-color, including custom images (e.g., a company logo). Therefore, the Microsoft Tag can have encoded data in the symbology information 204 of the Tag that includes a link (e.g. URL) or other hyperlink that references a location in memory (e.g. in a database) and/or a network address where data content is available/accessible via the encoded link. In other words, a Tag encoder would use a Tag coding scheme 209 to encode the unencoded link information 201 into corresponding symbology information 204, e.g. the hyperlink to a website (the unencoded link information 201) would be encoded as one or more graphical elements such as a company logo or even graphical elements (the symbology information 204) picturing the product itself.

It is also recognized that the symbology information 204 of the aggregated OMRI 200 can be encrypted (e.g. using a DES algorithm). In terms of the format of the symbology information 204, codewords embedded/encoded in the symbology information 204 are typically 8 bits long. It is recognized that the encoded order invoice 202 data represented by the symbology information 204 in the aggregated OMRI 200 can be broken up into multiple blocks, such that each block includes a number (e.g. 255) of codewords in length.

Another example of an optical machine-readable (e.g. OMRI 200) representation of encoded information or data are DataGlyphs, which are a new technology for encoding machine readable data onto paper documents or other physical media. They encode information into a number of tiny, individual glyph elements. Each graphical (e.g. glyph) element can consist of a small 45 degree diagonal line as short as 1/100th of an inch or less, depending on the resolution of the printing and scanning that is used, for example. Each glyph element (as the symbology information 204) represents a single binary 0 or 1 (as the decoded information 201), depending on whether it slopes to the left or right. Sequences of these glyph elements (symbology information 204) can be used to encode numeric, textual or other information (unencoded information 201).

As an example configuration of the dataglyph symbology and coding scheme 209, the individual glyphs are grouped together on the page (or displayed electronically on a display), where they form unobtrusive, evenly textured gray areas, like half-toned pictures. One of the reasons for using diagonal glyph elements is because research has shown that the patterns that they form when massed together are not visually distracting. DataGlyph technology allows ordinary business documents to carry thousands of characters of information hidden in these unobtrusive gray patterns that can appear as backgrounds, shading patterns or conventional graphic design elements. Often, their presence will go completely unnoticed. (The entire Gettysburg Address will fit in a DataGlyph about the size of a small US postage stamp). DataGlyph areas can be printed on a document as part of its normal printing process or displayed on a screen as part of the normal image rendering process. The information to be put in the DataGlyphs is encoded as a sequence of individual glyphs, and these can be printed either directly by the encoding software (for instance, by computer laser printer) or via a conventional printing process, such as offset. The glyphs are laid down on a finely spaced rectangular grid so that the area is evenly textured. In addition, each glyph area contains an embedded synchronization lattice or "skeleton"—a repeating, fixed pattern of glyphs which marks the boundaries of the glyph area and serves as a clocking track to improve the reliability of reading. Before data is placed into the synchronization frame, it's grouped into blocks of a few dozen bytes and error correcting code is added to each block. The amount of error correction to be used is chosen by the application, depending on the expected quality of the print-scan cycle. Higher levels of error correction increase the size of the glyph area needed for a given amount of data, but improve the reliability with which the data can be read back. This can be very important in environments where there's a high level of image noise (for example, fax) or where the documents are subjected to rough handling. As a final step, the bytes of data are randomly dispersed across the glyph area, so that if any part of the glyph area on the paper is severely damaged, the damage to any individual block of data will be slight, and thus easy for the error correcting code to recover. Together, error correction and randomization provide very high levels of reliability, even when the glyph area is impaired by ink marks, staples and other kinds of image damage.

In view of the above description, it is recognized that OMRI 200 can be embodied as barcodes, dataglyphs or other images that contain encoded symbology information 204 that can be decoded into unencoded information 201 (e.g. textual elements) using an appropriate coding scheme 209 that provides a mapping (e.g. rules) between the symbology information 204 to into the unencoded information 201 (e.g. the decoding process) and the unencoded information 201 into the symbology information 204 (e.g. the encoding process). In any event, the following description, for simplified example explanation purposes only, refers to OMRI 200 as barcodes 200. However, it is recognized that in the below description, the term barcode 200 can be interchanged with the broader meaning of OMRI 200, as desired.

Payment Application 13

Referring to FIG. 1, it is recognized that the payment application 13 can include a plurality of OMRI 200 related processing functionality, a plurality of transaction processing functionality and/or client functionality configured for network 11 communication with a processing system 14 in a client-server relationship. For example, the payment application 13 can be configured as a thin client of the processing system 14, such that the payment application 13 is configured to interact with a OMRI processing system of the payment processing system 14 via a series of web pages generated by the OMRI processing system, sent via network messages and displayed on the user interface 104. Accordingly, the payment application 13 would interact with a web browser (or other network communication program) to send and receive the messages via the network 11 containing payment processing specific information (e.g. settlement confirmation), i.e. to display the web pages on the user interface 104 including output data for the payment processing and to coordinate the entry of input data on the user interface 104 and network transmission of the input data for the payment processing related to the order invoice 202.

Order Interface 15

The order interface 15 can be configured as a thick client of the barcode generation capabilities (barcode generation module 62) processing system 14, such that the order interface 15 is provisioned with transaction and/or barcode processing functionality similar to (or at least a portion of) that functionality of the barcode processing system and/or barcode generation system of the processing system 14, as further described below. It is recognized that the thick client version of the order interface 15 could be configured to perform some of the barcode processing on behalf of or otherwise in substitution of any of the processing functionality of the barcode processing/generation system implemented by the processing system 14 during processing of the order invoice data 202. It is also recognized that the thick client version of the order interface 15 could also be configured to communicate over the network 11 via a series of web pages as generated or otherwise received by the order interface 15, sent as network messages between the computer device 17 and the processing system 14. It is also recognized that the order interface 15 could request or otherwise obtain the barcodes 200 pertaining to the order invoice 202 directly from the processing system 14, i.e. operating as a thin client of the processing system 14, rather than directly generating the barcodes 200 using systems of the order interface 15 itself. In either case, the following description of the barcode module 62 can be representative of the barcode generation capabilities of the barcode module 62 of the order interface 15 and/or of the barcode module 62 of the processing system 14, as desired.

Figure 2:
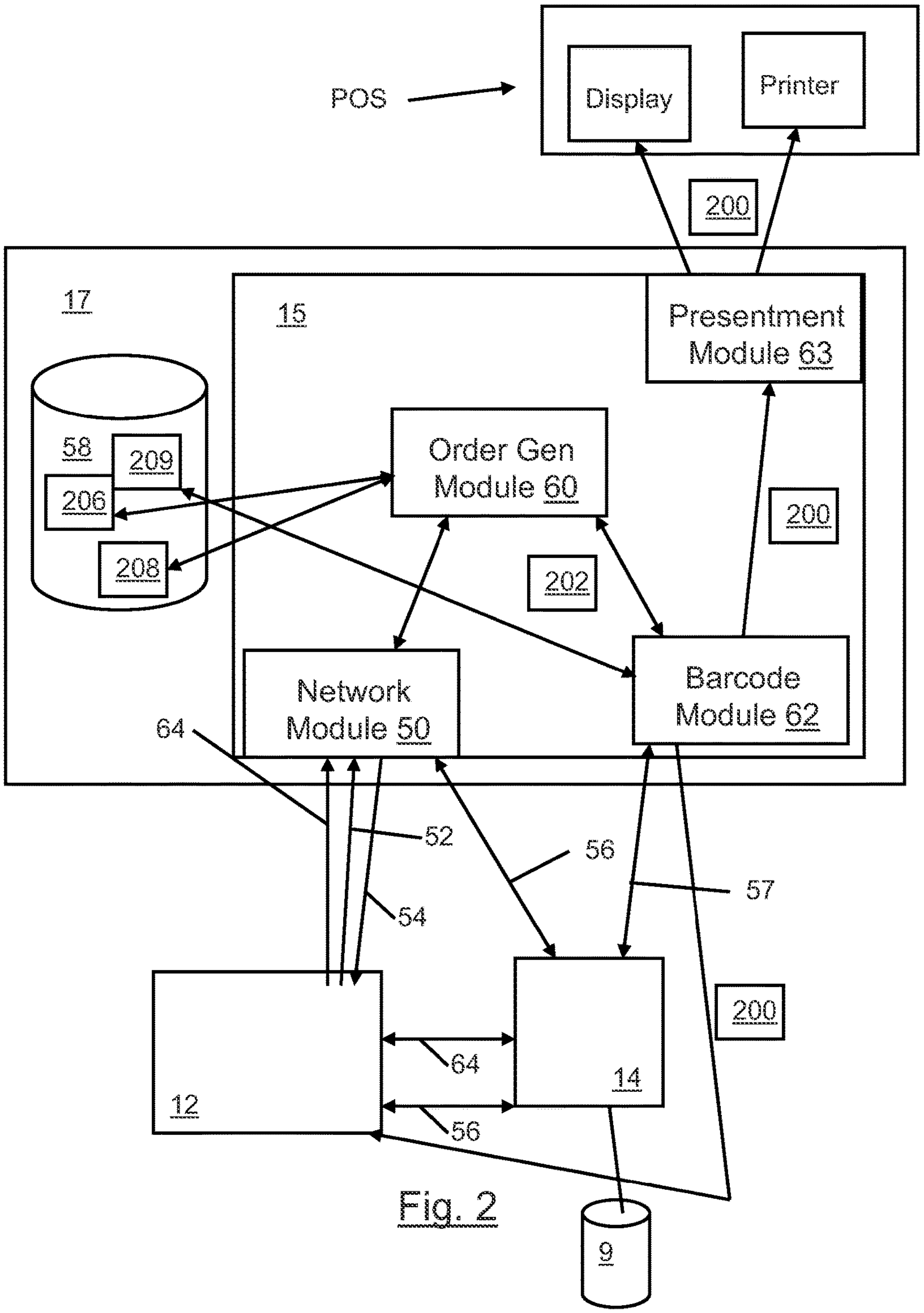
FIG. 2 is block diagram of a merchant interface of FIG. 1.

Referring to FIG. 2, shown is an example configuration of the order interface 15 that can include a network communications module 50 for receiving order request messages 52 from the computer device 12 and for sending order response messages 54 to the computer device 12 over a communication network 11. The communication network 11 can be a one or more networks, for example such as but not limited to: the Internet; an extranet; and/or an intranet. Further, the communication network 11 can be a wired or wireless network. It is also recognized that network messages 52,54 can be communicated between the computer device 12 and the network communications module 50 via short range wireless communication protocols such as but not limited to Bluetooth™, infrared (IR), radio frequency (RF), near field communication (NFC) and other protocols as desired.

The network communications module 50 can also be configured to send and receive order confirmation messages 56 over the communications network 11 with respect to the payment transaction processing system 14. Also included is a database 58 containing product data 206 (e.g. product pricing, product descriptions, product availability, etc.), merchant data 208 (e.g. merchant bank account number, a unique merchant reference ID of the merchant assigned by the processing system 14, tax or merchant business registration details), and network 11 address information of the payment transaction processing system 14. The database 58 can also have customized barcode definitions of a customized coding scheme 209 containing relationships (e.g. rules) between machine readable symbology and codewords used to encode (or decode) invoice information during generation of the aggregated barcode 200 used to represent the order invoice 202.

For example, the customized coding scheme 209 can be used to encode (i.e. translate) unencoded (e.g. text based) invoice information 201 of the order invoice 202 into symbology information 204, performed during generation of the aggregated barcode 200. The customized coding scheme 209 can also be used to decode (i.e. interpret) symbology information 204 present in the aggregated barcode 200 into unencoded invoice information 201 of the order invoice 202 during processing of the aggregated barcode 200 (e.g. by the computer device 12 and/or the processing system 14). It is recognized that the customized coding scheme 209 is known to the processing system 14 (e.g. by its barcode generation module 62) and can include customized codewords pertaining to specific invoice information such as but not limited to: merchant ID, customer ID; invoice amounts; invoice number; etc.

Figure 3:
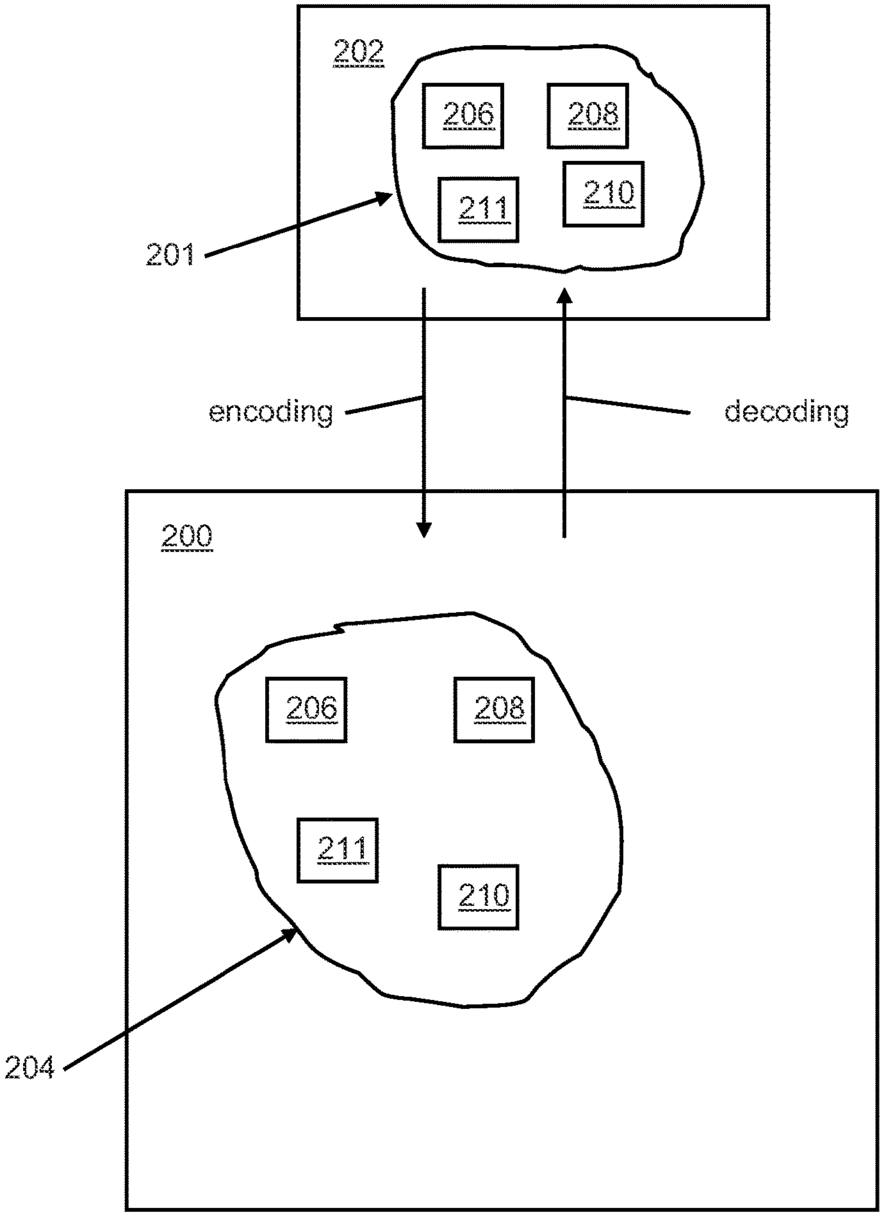
FIG. 3 shows example encoded and unencoded information for the system of FIG. 1.

Referring again to FIG. 2, the order interface 15 also has an order generation module 60 used to collect the order invoice 202 data (e.g. product data 206, merchant data 208, customer data 209 and/or invoice data 210—see FIG. 3) for the plurality of products ordered/selected by the customer 18 during interaction (e.g. online) with the order interface 15 via the computer device 12 (e.g. over the communications network 11). It is recognized that product data 206 and some of the customer data 211 of the order invoice 202, such as specific products ordered and quantity of each product, could be provided to the order generation module 60 obtained from order request messages 52 (e.g. via the network communications module 50). Further, the order generation module 60 would collect (or otherwise receive) the merchant data 208 for the order invoice 202 from the database 58 as well as pricing information (e.g. product data 206) of the ordered products. The order generation module 60 also generates the invoice data 210 pertaining to product pricing total (optionally including applicable taxes) that includes the total invoice amount owed by the customer and merchant identification information (associated with or otherwise embodying the merchant bank account information) of the order invoice 202. For example, in terms of the merchant bank account information, this could be supplied as part of the merchant information included in the order invoice 202 data or this could be supplied as a merchant identification information (e.g. merchant ID) used by the processing system 14 to lookup the actual merchant bank account information known to the processing system 14 and therefore abstracted from the customer 18.

The order interface 15 has the barcode module 62 that can be configured to use the available order invoice 202 data and the customized coding scheme 209 to generate the aggregated barcode 200. It is recognized that the aggregated barcode 200 can be generated by the barcode module 62 to contain data of the order invoice 202 pertaining to the product(s) chosen by the customer 18, including payment transaction data needed by the processing system 14 to settle the financial transaction (associated with the order invoice 202 data) by transferring funds from a specified account of the customer 18 to a specified account of the merchant 16. In this example, it is envisioned that the merchant 16 would preregister with the processing system 14 and be provided with a merchant ID that is associated with the merchant's actual account information (and any other sensitive merchant information) stored in a secure database 9 of the transaction processing system 14.

It is also envisioned as an alternative embodiment, that the barcode module 62 can be configured to not generate some or all of the barcodes 200, rather send via request messages 57 the relevant data of the order invoice 202 (as collected by the order generation module 60) to the processing system 14. In response, the order interface 15 would receive via the response messages 57 the generated barcode 200, for subsequent use in providing the barcode 200 to the customer 18. In this case, the barcode module 62 of the processing system 14 is the entity that generates the barcodes 200 upon request of the order interface 15

Referring again to FIG. 2, the order interface 15 can also optionally have a barcode presentment module 63, used by the merchant 16 to physically and/or electronically display the aggregated barcode 200 to the customer 18, for example when ordering and payment of the merchant products are occurring at the point of sale (POS). The POS is defined as a checkout location where the order transaction is initiated and confirmation of transaction acceptance or rejection is received, such that the merchant 16 is the business (bricks and mortar store or service) that takes payment from the customer 18 for the merchant's products. Therefore, it should be recognized that the order interface 15 of the POS system can defined to include (or otherwise be associated with—e.g. in communication with via a local area network—not shown) a physical POS terminal (e.g. an electronic cash register) in physical proximity to the customer 18 at the time of product order and purchase. For example, the barcode presentment module 63 can be configured to provide instructions to a printer for physically printing the aggregated barcode 200 and/or can be configured to provide instructions to an electronic display for displaying the aggregated barcode 200. In either case, the barcode presentment module 63 is configured to present the aggregated barcode 200 to the customer 18 for subsequent image capture (of the aggregated barcode 200) using the customer's computer device 12 (i.e. mobile device).

Encoding

One example of the customized coding interpretation scheme 209 for barcodes is a modified UPC (Universal Product Code) to include invoice specific data. Another example is a modified QR scheme, as further described below. The numbers and/or letters (e.g. ASCII—American Standard Code for Information Interchange) stored in the symbology information 204 of the aggregated barcode 200 are unique identifiers representing the particular standard code and custom code (representing invoice specific data) defined in the customized coding scheme 209 that, when read by a barcode decoder, can be used to look up additional information about the invoice item associated with the aggregated barcode 200. For example, the price, and optional description, of the product would be encoded in the aggregated barcode 200 using the symbology information 204.

Accordingly, the barcode module 62 can take the order invoice 202 data and uses the codes and associated rules of the customized coding interpretation scheme 209 to convert a piece of the unencoded invoice information 201 (for example, a letter, word, phrase, etc.) of the order invoice 202 data into another form or representation (one sign into another sign), not necessarily of the same type, i.e. the symbology information 204. In information processing performed by the barcode generation module 62, encoding is the process by which textual invoice information 201 of the order invoice 202 is converted into symbols (of the symbol format 204 defined by the customized coding scheme 209) to be communicated. Decoding is the reverse process, converting these code symbols 204 back into unencoded invoice information 201 understandable by a receiver. Therefore, the symbology information 204 generated from the unencoded invoice information 201 of the order invoice 202 data is used by the barcode generation module 62 to construct the aggregated barcode 200, according to the customized coding scheme 209. This aggregated barcode 200 is made available to the network communications module 50 to be sent in the order response message 54 (for example) to the computer device 12 (e.g. displayed on a browser screen of the user interface 104 of the computer device 12—see FIG. 6, delivered as an image file in the network message 54, etc.). It is recognized that the aggregated barcode 200 represents symbolically the unencoded data 201 of the order invoice 202.

Payment Processing Examples

The network communications module 50 is also configured to receive confirmation message(s) 56 from the processing system 14, for example as a result of interaction messages 56,64 between the computer device 12 of the customer 18 and the processing system 14, such that confirmation message(s) 56 include a confirmation that customer funds have been used to pay the invoice amount (i.e. customer funds have been transferred—or promised for transfer—from the customer account to the merchant account in payment of the order invoice 202).

In one embodiment, the computer device 12 receives the aggregated barcode 200 from the order interface 15, processes the aggregated barcode 200 by at least selecting a mode of payment (e.g. specifying a credit card number, a debit card number, or any other account information for use in paying the monetary amount of the invoice) and sends order invoice 202 data (e.g. invoice information 201 decoded from the symbology information 204 of the aggregated barcode 200, and/or at least some of the symbology information 204 itself of the aggregated barcode 200) and account data pertaining to the selected mode of payment to the processing system 14 as a transaction request 64 for payment processing. The transaction processing system 14 then processes the received order invoice 202 information (e.g. received invoice information 201 and/or invoice information 201 decoded by the processing system 14 from the received symbology information 204 of the aggregated barcode 200) contained in the transaction request 64 and sends instructions to the respective financial institutions (not shown), for example, associated with the customer and merchant account information to debit the customer account and credit the merchant account by the invoice amount of the order invoice 202. The merchant confirmation message(s) 56 received by the order interface 15 could contain details of the payment processing including that the merchant account was (or will be) credited by the invoice amount of the order invoice 202, as well as any invoice data 210 identifying the order invoice 202 (e.g. invoice ID) for merchant accounting records. It is recognized that the computer device 12 would could also receive customer confirmation message(s) 56 contain details of the payment processing including that the customer account was (or will be) debited by the invoice amount of the order invoice 202, as well as any invoice data 210 identifying the order invoice 202 (e.g. invoice ID) for customer accounting records.

In an alternative embodiment, the computer device 12 receives the aggregated barcode 200 from the order interface 15, processes the aggregated barcode 200 by at least selecting a mode of payment (e.g. specifying a credit card number, a debit card number, or any other account information for use in paying the monetary amount of the invoice) and sends order invoice 202 data (e.g. invoice information 201 decoded from the symbology information 204 of the aggregated barcode 200, and/or at least some of the symbology information 204 itself of the aggregated barcode 200) and account data pertaining to the selected mode of payment to the order interface 15 as a transaction request 64, for subsequent forwarding as confirmation message(s) 56 by the order interface 15 to the processing system 14 for payment processing. The processing system 14 then processes the received order invoice 202 information (e.g. received textual invoice information 201 and/or invoice information 201 decoded from the received symbology information 204 of the aggregated barcode 200) contained in the confirmation message(s) 56 and sends instructions to the respective financial institutions (not shown), who can be part of or separate to the processing system 14. The financial institutions, for example based on the received instructions from the processing system 14, uses the customer and merchant account information to debit the customer account and credit the merchant account by the invoice amount of the order invoice 202. Subsequent confirmation message(s) 56 received by the order interface 15 could contain details of the payment processing including that the merchant account was (or will be) credited by the invoice amount of the order invoice 202, as well as any invoice data 210 identifying the order invoice 202 (e.g. invoice ID) for merchant accounting records.

In is recognized in the above embodiments, that in terms of the customer account information, this could be supplied as specifically the customer account number or this could be supplied as customer identification information (e.g. customer ID) used by the processing system 14 to lookup the actual customer bank account information known to the processing system 14 and therefore the customer account number would be abstracted from the merchant 18 and the general communications over the network 11. In this example, it is envisioned that the customer 18 would preregister with the processing system 14 and be provided with a customer ID that is associated with the customer's actual account information (and any other sensitive customer information) in a secure database 9 of the processing system 14.

Order Invoice Content

Referring again to FIGS. 1 and 3, the order invoice 202 is used by the customer 18 and the merchant 16 to define what has been purchased, when, by whom, from whom, and how much money has been spent on what. The aggregated barcode 200 is generated to include the symbology information 204 aggregating product invoice information 201 for two or more products (for example) as the order invoice 202, such that the symbology information 204 of the aggregated barcode 200 encodes information 201 of product data 206, merchant data 208, customer data 211 and/or invoice data 210 of the order invoice 202. Therefore, the aggregated barcode 200 represents the order invoice 202, using the symbology information 204, defined as a commercial contract issued by the merchant 16 to the customer 18, indicating the products, quantities, and/or agreed prices for products the merchant has (or will) provide the customer 18 in exchange for payment (i.e. debit of customer account and corresponding debit of merchant account) of the order invoice 202. Further, the order invoice 202 indicates the customer 18 must pay the merchant 16, according to any payment terms contained in the order invoice 202. It is also recognized that the order invoice 202 in a rental or professional services context could also include a specific reference to the duration of the time being billed, so rather than quantity, price and cost, the invoicing amount can be based on quantity, price, cost and duration. For example, the rental/services order invoice 202 can refer to the actual time (e.g. hours, days, weeks, months, etc.) being billed.

It is recognized that from the point of view of a merchant 16, the order invoice 202 can be regarded as a sales invoice. From the point of view of the customer 18, the order invoice 202 can be regarded as a purchase invoice. The order invoice 202 can identify both the customer 18 and the merchant 16, but the term "invoice" generally refers to the fact that money is owed or owing between the merchant 16 and customer 18.

For example, the product data 206 of the symbology information 204 can include for each product, information such as but not limited to: a product identifier (e.g. product number or code—such as a UPC code), a product purchase price (e.g. unit price of the product), a quantity number of the product (e.g. the number 2 in the case where two of the same product in the purchase order); and/or a description of the product. The merchant data 208 of the symbology information 204 can include information such as but not limited to: name and contact details of the merchant; a bank account number of the merchant; a unique merchant reference ID of the merchant assigned by the processing system 14; location of the merchant retail location; tax or merchant registration details (e.g. tax number or business number such as a VAT (value added tax) identification number or a registration number for GST purposes in order to claim input tax credits) and/or indication of whether the purchase is an online or physical retail location purchase. The invoice data 210 of the symbology information 204 can include information such as but not limited to: a unique invoice reference number (for use in tracking correspondence associated with the order invoice 202); date of the invoice; tax payments as a percentage of the purchase price of the each of the products (e.g. GST or VAT); date (e.g. approximate) that the products were (or are to be) sent or delivered; purchase order number (or similar tracking numbers requested by the customer 18 to be mentioned on the order invoice 202); total amount charged (optionally with breakdown of taxes) for the product(s); payment terms (including method of payment, date of payment, and/or details about charges for late payment); international customs information; shipping destination; and/or shipping origination location. It is recognized that the data 206,208,210,211 of the symbology information 204 is also represented in at least whole or in part in the textual invoice information 201. In this manner, what symbology information 204 in the aggregated barcode 200 can be decoded (by the computer device 12 and/or the processing system 14) into the invoice information 201, and the invoice information 201 can be encoded (by the order interface 15) into the symbology information 204.

In terms of customer data 211, this data of the symbology information 204 can include information such as but not limited to: a reference code to be passed along the transaction identifying the payer (e.g. customer 18); name and contact details (e.g. address) of the customer 18; and/or an account number (e.g. a bank account number, a credit card number, a debit card number of the customer 18) identifying the source of funds to be used to pay for the products. It is recognized that the account number identifying the customer 18 source of funds to be used to pay for the products, instead of being encoded in the symbology 204, can be supplied by the customer 18 using the user interface 104 of the customer computer device, as further described below.

As discussed above, it is recognized that the customized coding scheme 209 contains codewords and rules for use in translating (i.e. encoding, decoding) between the symbology information 204 of the aggregated barcode 200 and the invoice information 201 of the order invoice 202.

Further Embodiment of the Product Ordering System 10

Figure 4:
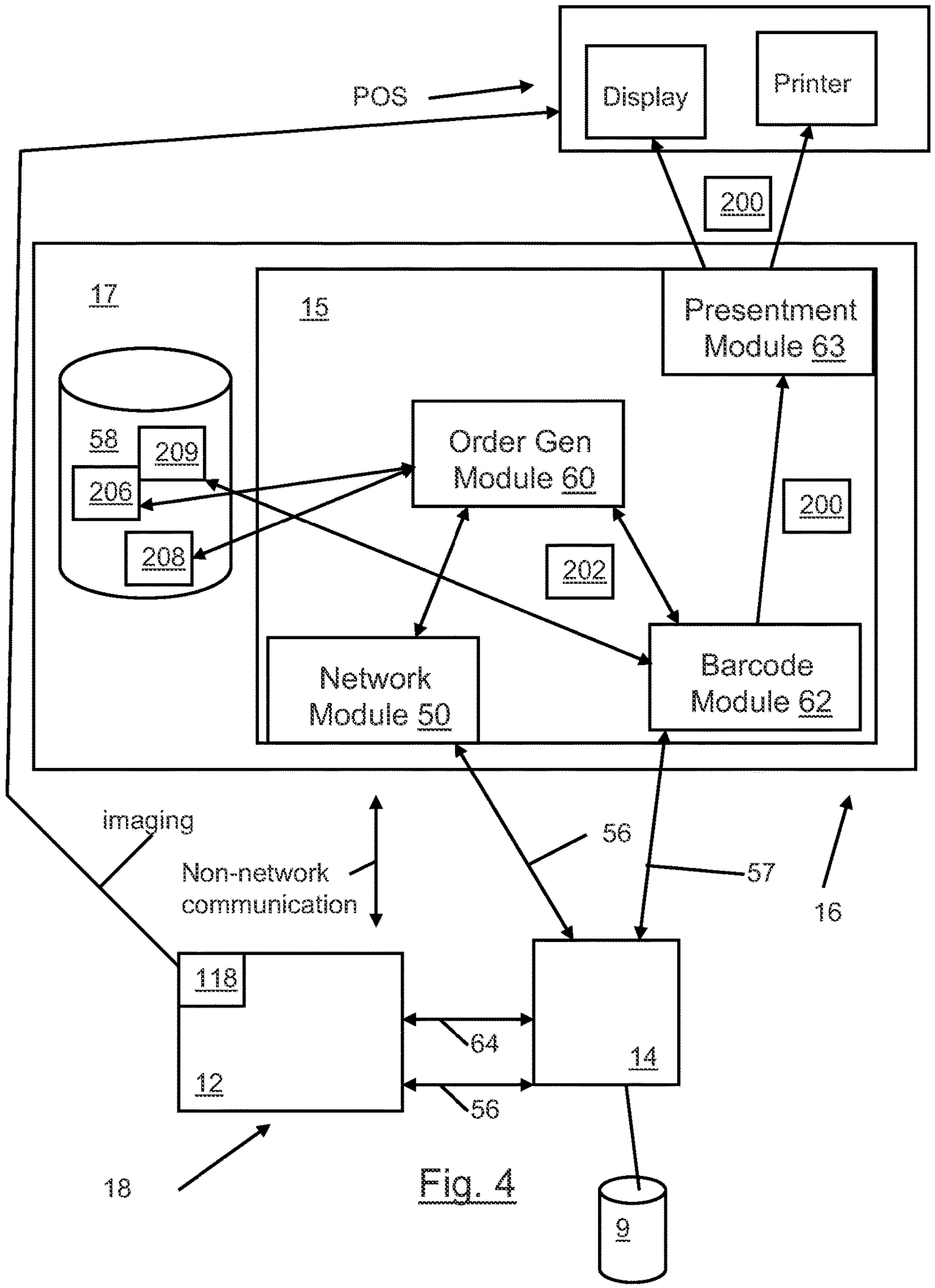
FIG. 4 is an alternative embodiment of the merchant interface of FIG. 2.

Referring to FIG. 4, shown is an embodiment of the product ordering system 10 such that products are ordered by the customer 18 are specified in person rather that electronically using network messages. For example, products can be scanned by a store clerk taken from a customer shopping cart or can be food and/or beverage products ordered verbally at a restaurant.

In this embodiment, the computer device 12 is a mobile device that is not connected (i.e. does not communicate via network messages) to the order interface 15 by the network 11, rather the computer device 12 uses the imager 118 (see FIG. 6) to capture an image of the aggregated barcode 200 (presented by the order interface 15 at the point of sale) for subsequent processing. In this case, it is recognized that the order interface 15 is in communication with the processing system 14 via the network 11 and the computer device 12 is also in communication with the processing system 14 via the network 11, as described above with respect to the product ordering system 10 described in relation to FIG. 2.

Merchant Device 17

Figure 5:
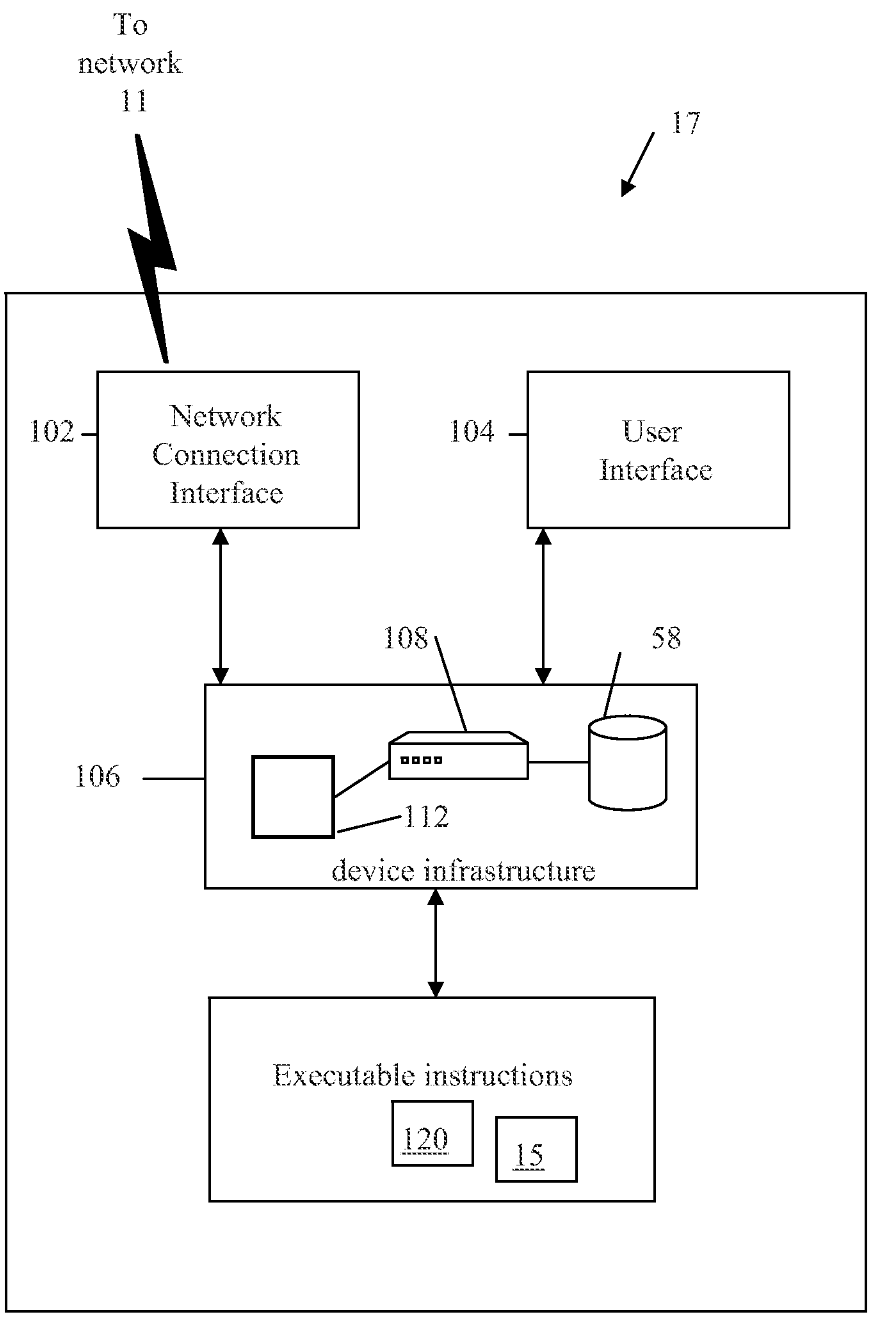
FIG. 5 is a block diagram of a computer device implementing the merchant interface of FIG. 1.

Referring to FIG. 5, the merchant device 15 can be a wireless-enabled (e.g. WiFi, WAN, etc.) personal data assistant, or email-enabled wireless telephone, for example a tablet. In addition, the wireless communications are not limited to only facilitating transmission of text data (e.g. encrypted) and can therefore be used to transmit image data, audio data or multimedia data, for example, as desired.

As shown in FIG. 5, the merchant device 17 comprises a communication network interface 102, a user interface 104, and a data processing system 106 in communication with the network interface 102 and the user interface 104. The network interface 102 can include one or more antennas for wireless communication over the communications network 11. The user interface 104 can comprise a data entry device (such as keyboard, microphone or writing tablet), and a display device (such as an LCD display).

The data processing system 106 includes a central processing unit (CPU) 108, otherwise referred to as a computer processor, and a non-volatile or volatile memory storage device (e.g. DISC) 58 (such as a magnetic disc memory or electronic memory) and a read/write memory (RAM) 112 both in communication with the CPU 108. The memory 58 includes data which, when loaded into the RAM, comprise processor instructions for the CPU 108 which define memory objects for allowing the merchant device 17 to communicate with the computer device 12 and the processing system 14 (e.g. one or more processing servers) over the communications network 11. The instructions can be used to provide or otherwise host the order interface 15 as a website running on the merchant computer device 17 and accessed via the network 11.

The CPU 108 is configured for execution of the order interface 15 (see FIG. 2) for facilitating communication with the transaction processing system 14 and the computer device 12. For example, it is recognised that the order interface 15 is used to coordinate, as implemented by the CPU 108, the generation, receipt, and processing of the invoice information 201 and the symbology information 204 of the aggregated barcode 200.

The CPU 108 facilitates performance of the merchant device 17 configured for the intended task (e.g. of the respective module(s) of the order interface 15) through operation of the network interface 102, the user interface 104 and other application programs/hardware (e.g. web browser made available to the order interface 15) of the merchant device 17 by executing task related instructions. These task related instructions can be provided by an operating system, and/or software applications located in memory, and/or by operability that is configured into the electronic/digital circuitry of the processor(s) 108 designed to perform the specific task(s). Further, it is recognized that the device infrastructure 106 can include the computer readable storage medium 58 coupled to the processor 108 for providing instructions to the processor 108 and/or to load/update the instructions. The computer readable medium 58 can include hardware and/or software such as, by way of example only, memory cards such as flash memory or other solid-state memory. The storage 58 can also contain the customized coding interpretation scheme 209 for use in encoding and/or decoding the aggregated barcode 200.

Further, it is recognized that the merchant device 17 can include the executable applications comprising code or machine readable instructions for implementing predetermined functions/operations including those of an operating system and the modules 50,60,62,63, for example. The processor 108 as used herein is a configured device and/or set of machine-readable instructions for performing operations as described by example above, including those operations as performed by any or all of the modules 50,60,62,63. As used herein, the processor 108 may comprise any one or combination of, hardware, firmware, and/or software. The processor 108 acts upon information by manipulating, analyzing, modifying, converting or transmitting information for use by an executable procedure or an information device, and/or by routing the information with respect to an output device. The processor 108 may use or comprise the capabilities of a controller or microprocessor, for example.

Computer Device 12

Figure 6:
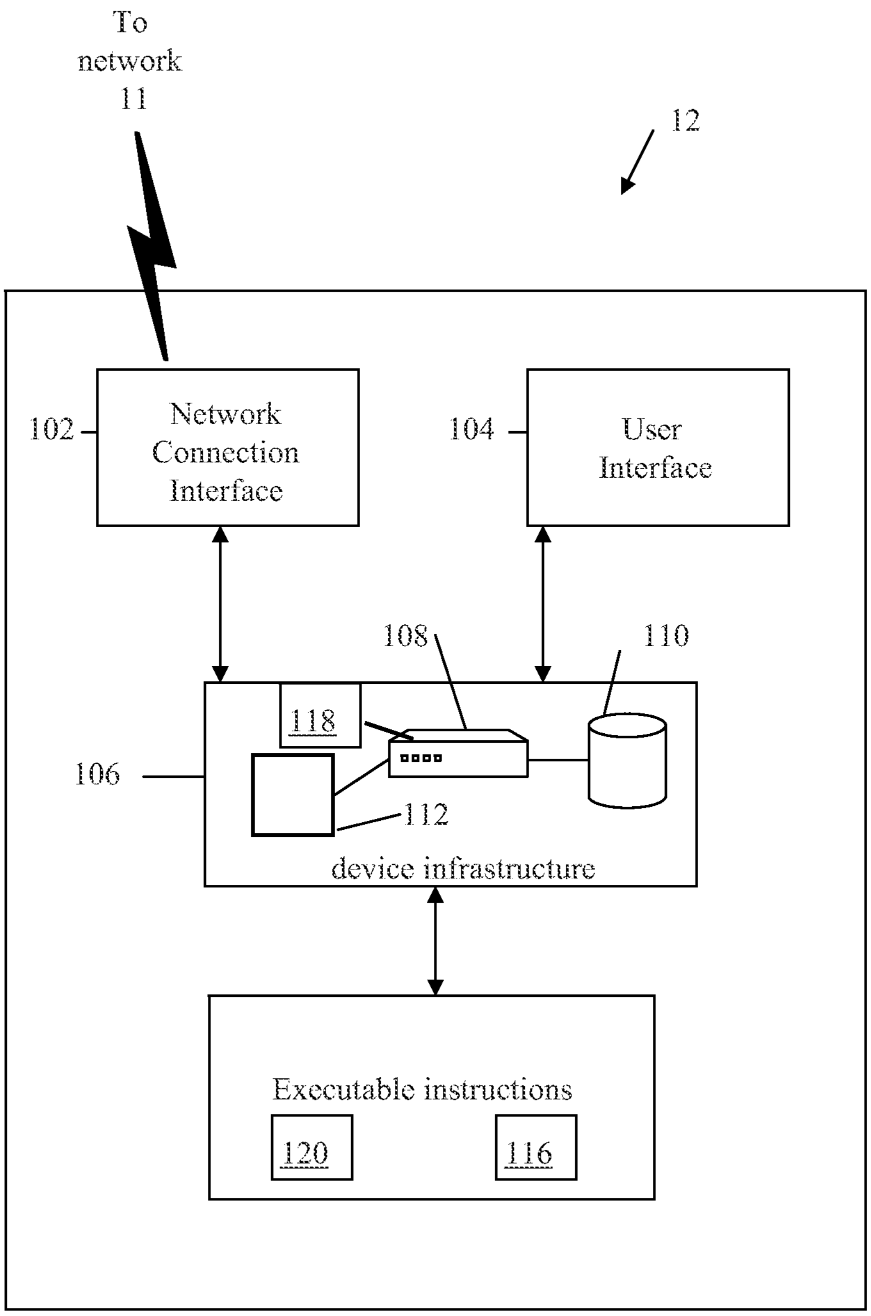
FIG. 6 is a block diagram of a computer device implementing the payment application of FIG. 1.

Referring to FIG. 6, each computer device 12 can be a wireless-enabled (e.g. WiFi, WAN, etc.) personal data assistant, or email-enabled wireless telephone, or a desktop computer terminal. In addition, the wireless communications are not limited to only facilitating transmission of text data (e.g. encrypted) and can therefore be used to transmit image data, audio data or multimedia data, for example, as desired.

As shown in FIG. 6, the computer device 12 comprises a communication network interface 102, a user interface 104, and a data processing system 106 in communication with the network interface 102 and the user interface 104. The network interface 102 can include one or more antennas for wireless communication over the communications network 11. Preferably, the user interface 104 comprises a data entry device (such as keyboard, microphone or writing tablet), and a display device (such as an LCD display). The display screen of the user interface 104 can be used to visually present a graphical user interface (GUI) of the payment application 13 to the customer 18, including results of the barcode 200 image capture process. The display screen can employ a touch screen display, in which case the customer 18 can manipulate (i.e. enter and/or modify/delete) invoice information (e.g. product data 206, merchant data 208, customer data 211 and/or invoice data 210) obtained as textual invoice information 201 from the decoded aggregated barcode 200 and/or as supplemental information (e.g. customer data 211) added to the received invoice information 201 in order to generate the transaction request 64.

The data processing system 106 includes a central processing unit (CPU) 108, otherwise referred to as a computer processor, and a non-volatile memory storage device (e.g. DISC) 110 (such as a magnetic disc memory or electronic memory) and a read/write memory (RAM) 112 both in communication with the CPU 108. The memory 110 includes data which, when loaded into the RAM, comprise processor instructions for the CPU 108 which define memory objects for allowing the computer device 12 to communicate with the merchant device 17 (for accessing the order interface 15) and the processing system 14 (e.g. one or more processing servers) over the communications network 11. The mobile device 12, and the processor instructions for the CPU 108 will be discussed in greater detail below.

The CPU 108 is configured for execution of a payment application 13 for facilitating communication between the transaction processing system 14 and optionally the merchant device 17. For example, it is recognised that the payment application 13 is used to coordinate, as implemented by the CPU 108, the generation, receipt, and processing of the aggregated barcode 200 and the transaction messages 64. For example, the payment application 13 can operate the imager 118 and the encoder/decoder 120, as further described below.

The CPU 108 facilitates performance of the computer device 12 configured for the intended task (e.g. of the respective module(s) of the payment application 13) through operation of the network interface 102, the user interface 104 and other application programs/hardware (e.g. web browser made available to the payment application 13) of the computer device 12 by executing task related instructions. These task related instructions can be provided by an operating system, and/or software applications located in memory, and/or by operability that is configured into the electronic/digital circuitry of the processor(s) 108 designed to perform the specific task(s). Further, it is recognized that the device infrastructure 106 can include a computer readable storage medium 110 coupled to the processor 108 for providing instructions to the processor 108 and/or to load/update the instructions. The computer readable medium 110 can include hardware and/or software such as, by way of example only, memory cards such as flash memory or other solid-state memory.

Further, it is recognized that the computer device 12 can include the executable applications comprising code or machine readable instructions for implementing predetermined functions/operations including those of an operating system, the imager 118, the decoder 120, and the payment application 13, for example. The processor 108 as used herein is a configured device and/or set of machine-readable instructions for performing operations as described by example above, including those operations as performed by any or all of the imager 118, the decoder 120, and the payment application 13. As used herein, the processor 108 may comprise any one or combination of, hardware, firmware, and/or software. The processor 108 acts upon information by manipulating, analyzing, modifying, converting or transmitting information for use by an executable procedure or an information device, and/or by routing the information with respect to an output device. The processor 108 may use or comprise the capabilities of a controller or microprocessor, for example.

The data processing system 106 includes the imager 118 (e.g. a camera including an image sensor—e.g. CCD or CMOS sensor) suitable for capturing images of the aggregated barcode 200 displayed or otherwise presented by the merchant 16 within range of the imager 118. The payment application 13 is configured to control the operation of the imager 118 to capture the image of the aggregated barcode 200, as well as to operate the decoder to provide for decoding at least a portion of the symbology information 204 into invoice information 201 for subsequent use in generating the transaction request message 64 directed to the processing system 14. The storage 110 can also contain the customized coding interpretation scheme 209 for use in decoding the aggregated barcode 200.

Decoding

One example of the customized coding interpretation scheme 209 for barcodes is modified UPC (Universal Product Code). The numbers and/or letters (e.g. ASCII—American Standard Code for Information Interchange) encoded in the barcode 200 are unique identifiers representing the particular custom code defined in the customized coding scheme 209 that, when read by the barcode decoder 120, can be used to look up additional information about the invoice item associated with the aggregated barcode 200. For example, the price and optionally description of the product would be stored in the aggregated barcode 200 using the symbology information 204. The data could be decoded from the barcode 200 and used to look up the price and description of the item from the customized coding scheme 209.

The decoder 120 circuitry and/or software is used to recognize and/or to make sense of the symbology information 204 that make up barcode 200. The decoder 120 can translates symbols 204 into corresponding digital output in a traditional data format (i.e. as invoice information 201). In order to decode the information in barcode 200, for example for 1D barcodes, the widths of the bars and spaces are recognized via edge detection and their widths measured.

Operation of the Purchase Ordering System 10

Figure 7:
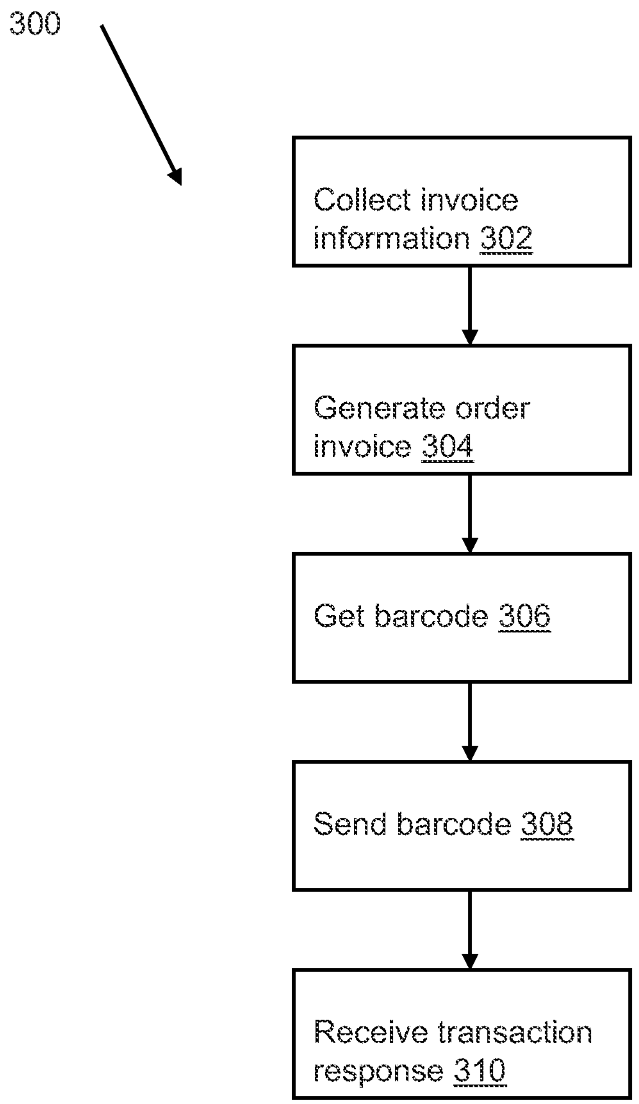
FIG. 7 is an example operation of the system of FIG. 1.

Referring to FIGS. 1, 2 and 7, shown is an example operation 300 of the order interface 15 of the merchant 16. The order interface 15 is configured for assisting ordering and payment processing of the order invoice 202 associated with one or more products selected by the customer 18.

At step 302, the order interface 15 (e.g. via the network module 50) collects product data 206 about the product including a product price, and merchant data 208 including merchant identification for use in identifying merchant financial account information by the processing system 14.

At step 304, the order generation module 60 generates the order invoice information including the product data 206, the merchant data 208, a total invoice amount for payment by the customer 18 and an invoice identification for use by at least an accounting system of the merchant 16. At step 306, the barcode module 62 either requests and receives (from the processing system 14) or generates the symbology information 204 in an aggregated barcode 200 associated with the order invoice 202, the symbology information 204 including at least a portion of the order invoice information encoded using a coding scheme 209 of a barcode. At step 308, the barcode module 62, for example, provides an image of the aggregated barcode 200 to the customer 18 for use in generating the transaction request 64 for settlement of the order invoice 202, and receives at step 310 the transaction response 56 from the processing system 14 (for example), the transaction response 56 including processing details of the transaction request 64 by the processing system 14, the transaction response 56 indicating transaction approval or transaction denial of the order invoice 202.

While the exemplary embodiments have been described herein, it is to be understood that the invention is not limited to the disclosed embodiments. The invention is intended to cover various modifications and equivalent arrangements included within the spirit and scope of the appended claims, and scope of the claims is to be accorded an interpretation that encompasses all such modifications and equivalent structures and functions.

I claim:

1. A system for processing an aggregated barcode, the system comprising:

a transaction processing system comprising a computer processor coupled to a memory, wherein the computer processor is programmed to assemble order information pertaining to a product and provide the order information including product data and merchant data to the customer by:

electronically receiving a request message containing the order information collected at a merchant's point of purchase, said order information including the product data about the product including a product identifier and the merchant data including at least merchant identification information for use in identifying merchant financial account information stored in merchant profile data in a database by the transaction processing system;

generating and sending symbology information in the aggregated barcode associated with the order to an order interface of the merchant, the symbology information including the order information encoded using a coding scheme of a barcode, the order information including the product identifier;

receiving a transaction request including customer identification and an image of the aggregated barcode directly from a mobile device of a customer without sending the transaction request to the order interface, the aggregated barcode scanned by the mobile device with an imager of the mobile device thereby creating the image of the aggregated barcode;

comparing by the computer processor said image of the aggregated barcode to the merchant profile data in the database to identify the merchant financial account information; and sending a transaction response to the order interface, the transaction response generated by the transaction processing system based on the transaction request received directly from the mobile device, the transaction response including processing details of the transaction request indicating a transaction approval or a transaction denial of the order, the processing details based on the customer identification matching customer financial account information that is withheld from the order interface of the merchant.

2. The system of claim 1, wherein the order information includes product prices and product identifiers aggregated for a plurality of products selected by the customer and the total invoice amount of the invoice data incorporates said product prices.

3. The system of claim 2 further comprising the order interface coupled to a point of sale (POS) terminal with a display, such that the aggregated barcode is sent from the order interface to the POS terminal for display on the display, thereby providing for access to the aggregated barcode by the customer using the imager.

4. The system of claim 2 further comprising the order interface coupled to a printer, such that the image is sent from the order interface to the printer for printing of the aggregated barcode on a physical medium, thereby providing for access to the aggregated barcode by the customer using the imager.

5. The system of claim 2, wherein the product is selected from the group comprising: goods and services.

6. The system of claim 5, wherein the order information relates a type of order selected from the group consisting of: a restaurant bill; a retail purchase either in person or online; and a services agreement.

7. The system of claim 6, wherein the merchant identification information is an abstracted version of the merchant financial account information, such that the transaction payment processing system is able to link the merchant identification information with the actual merchant financial account information stored by the transaction payment processing system.

8. The system of claim 2, wherein the transaction approval includes customer identification information and indication of a funds transfer to the merchant financial account satisfying the total invoice amount.

9. The system of claim 2, wherein the customer identification is for use by the transaction payment processing system in accessing actual customer financial account information during processing of the transaction request.

10. The system of claim 9, wherein the mobile device is configured to include invoice information from the aggregated barcode in the transaction request and to also include the customer identification in the transaction request, such that the customer identification is withheld from the order interface.

11. The system of claim 1, wherein the order information includes payment terms.

12. The system of claim 1, wherein the order invoice information includes a quantity of the product or a description of the product.

13. A method for processing an aggregated barcode, the method comprising:

electronically receiving a request message containing order information collected at a merchant's point of purchase, said order information including product data about a product including a product identifier and merchant data including at least merchant identification information for use in identifying merchant financial account information stored in merchant profile data in a database;

generating and sending symbology information in the aggregated barcode associated with the order to an order interface of the merchant, the symbology information including the order information encoded using a coding scheme of a barcode, the order information including the product identifier;

receiving a transaction request including customer identification and an image of the aggregated barcode from a mobile device of the customer without sending the transaction request to the order interface, the aggregated barcode scanned by the mobile device with an imager of the mobile device thereby creating the image of the aggregated barcode;

comparing said image of the aggregated barcode to merchant profile data in the database to identify the merchant financial account information; and sending a transaction response to the order interface, the transaction response generated based on the transaction request received directly from the mobile device, the transaction response including processing details of the transaction request indicating a transaction approval or a transaction denial of the order, the processing details based on the customer identification matching customer financial account information that is withheld from the order interface of the merchant.

14. The method of claim 13, wherein the order information includes product prices and product identifiers aggregated for a plurality of products selected by the customer and the total amount of the data incorporates said product prices.

15. The method of claim 14 further comprising the step of sending the image to a printer for printing of the aggregated barcode on a physical medium, thereby providing for access to the aggregated barcode by the customer using the imager.

16. The method of claim 14 further comprising the step of sending the aggregated barcode to a point of sale (POS) terminal with a display for display on the display, thereby providing for access to the aggregated barcode by the customer using the imager.

* * * * *